(12) United States Patent
Tokunaga et al.

(10) Patent No.: US 12,071,370 B2
(45) Date of Patent: Aug. 27, 2024

(54) GLASS SUBSTRATE, BLACK MATRIX SUBSTRATE, AND DISPLAY PANEL

(71) Applicant: AGC Inc., Tokyo (JP)

(72) Inventors: Hirofumi Tokunaga, Tokyo (JP); Daisuke Kobayashi, Tokyo (JP); Kazutaka Ono, Tokyo (JP); Atsuyoshi Takenaka, Tokyo (JP); Yoshitaka Maeyanagi, Tokyo (JP)

(73) Assignee: AGC Inc., Tokyo (JP)

( * ) Notice: Subject to any disclaimer, the term of this patent is extended or adjusted under 35 U.S.C. 154(b) by 816 days.

(21) Appl. No.: 17/160,468

(22) Filed: Jan. 28, 2021

(65) Prior Publication Data

US 2021/0147290 A1 May 20, 2021

Related U.S. Application Data

(63) Continuation of application No. PCT/JP2019/033916, filed on Aug. 29, 2019.

(30) Foreign Application Priority Data

Sep. 18, 2018 (JP) .................................. 2018-173839

(51) Int. Cl.
*C03C 21/00* (2006.01)
*C03C 3/087* (2006.01)
(Continued)

(52) U.S. Cl.
CPC ............. *C03C 21/008* (2013.01); *C03C 3/087* (2013.01); *C03C 3/091* (2013.01); *C03C 17/009* (2013.01);
(Continued)

(58) Field of Classification Search
None
See application file for complete search history.

(56) References Cited

U.S. PATENT DOCUMENTS

| | | | | |
|---|---|---|---|---|
| 6,065,309 | A | * 5/2000 | Cooper | .................. C03B 18/20 65/182.3 |
| 2011/0082022 | A1 | * 4/2011 | Ellison | .................. C03C 1/004 501/66 |
| 2016/0130178 | A1 | * 5/2016 | Kashima | ............... C03C 21/002 428/141 |

FOREIGN PATENT DOCUMENTS

CN 106458734 A 2/2017
JP 2000-221485 A 8/2000
(Continued)

OTHER PUBLICATIONS

International Search Report issued Oct. 15, 2019 in PCT/JP2019/033916 filed on Aug. 29, 2019, 2 pages.

*Primary Examiner* — Anthony J Frost
(74) *Attorney, Agent, or Firm* — Oblon, McClelland, Maier & Neustadt, L.L.P.

(57) ABSTRACT

The present invention relates to a glass substrate including a pair of main surfaces and an end surface, and having a surface layer diffusion Sn atom concentration of $2.0 \times 10^{18}$ atomic/cm$^3$ or more and $1.4 \times 10^{19}$ atomic/cm$^3$ or less in at least one of the main surfaces, the surface layer diffusion Sn atom concentration being obtained by subtracting an Sn atom concentration of an inside of the glass substrate from an Sn atom concentration of a surface layer of the glass substrate, in which the Sn atom concentration of a surface layer of the glass substrate is defined as an Sn atom concentration at a depth of 0.1 to 0.3 μm from the main surface and the Sn atom concentration of an inside of the glass substrate is defined as an Sn atom concentration at a depth of 9.0 to 9.2 μm from the main surface.

9 Claims, 2 Drawing Sheets

(51) Int. Cl.
*C03C 3/091* (2006.01)
*C03C 17/00* (2006.01)
*C03C 19/00* (2006.01)
*G02F 1/1335* (2006.01)

(52) U.S. Cl.
CPC ........ *C03C 19/00* (2013.01); *G02F 1/133512* (2013.01); *C03C 2203/10* (2013.01)

(56) References Cited

FOREIGN PATENT DOCUMENTS

| | | | | |
|---|---|---|---|---|
| JP | 2000-302487 A | 10/2000 | | |
| JP | 2001-192235 A | 7/2001 | | |
| WO | WO 2014/163035 A1 | 10/2014 | | |
| WO | WO-2015178339 A1 * | 11/2015 | ............. | C03C 15/02 |

* cited by examiner

GLASS SUBSTRATE, BLACK MATRIX SUBSTRATE, AND DISPLAY PANEL

TECHNICAL FIELD

The present invention relates to a glass substrate. The present invention also relates to a black matrix substrate in which a black matrix film is formed on a surface of the glass substrate, and a display panel including the black matrix substrate.

BACKGROUND ART

Glass substrates have been used broadly as substrates for flat panel displays such as liquid crystal displays or organic EL displays, substrates for solar cells, or substrates for organic EL lighting and the like. For such an application, a film such as a film composed of a resin material or the like (hereinafter also referred to as a resin film) is formed on a glass substrate to improve characteristics such as display characteristics.

However, interaction between the film and the glass substrate is so weak that their adhesion may be insufficient. Thus, the film may be locally separated from the glass substrate in a production process, causing a problem such as deterioration in production yield, increase in trouble associated with management, or increase in manufacturing cost.

In order to solve such a problem, for example, a method for imparting an organic functional group to the glass substrate, or a method for forming a coating film is used to improve the interaction between the resin material and the glass substrate to thereby improve the adhesion (Patent Literatures 1 to 4).

CITATION LIST

Patent Literature

Patent Literature 1: JP-A-2000-221485
Patent Literature 2: JP-A-2000-302487
Patent Literature 3: JP-A-2001-192235
Patent Literature 4: WO2014/163035

SUMMARY OF INVENTION

Technical Problem

However, as a flat panel display becomes higher in definition or the like, finer pattern forming or the like is requested to a film formed on a surface of a glass substrate. Thus, the glass substrate is required to have higher adhesion between the film and the glass substrate and further to be able to inhibit burden of management and cost on manufacturing.

Therefore, an object of the present invention is to provide a glass substrate which is excellent in adhesion to a film formed on a surface of the glass substrate, and which is high in production efficiency.

Solution to Problem

The present inventors found that a glass substrate in which an Sn concentration in at least one main surface is not lower than a specific range is high in adhesion to a film formed on the surface of the glass substrate, and excellent in productivity. Thus, the present inventors completed the present invention.

That is, an aspect of the present invention provides a glass substrate including a pair of main surfaces and an end surface, and having a surface layer diffusion Sn atom concentration of $2.0 \times 10^{18}$ atomic/cm$^3$ or more and $1.4 \times 10^{19}$ atomic/cm$^3$ or less in at least one of the main surfaces, the surface layer diffusion Sn atom concentration being obtained by subtracting an Sn atom concentration of an inside of the glass substrate from an Sn atom concentration of a surface layer of the glass substrate, in which the Sn atom concentration of a surface layer of the glass substrate is defined as an Sn atom concentration at a depth of 0.1 to 0.3 μm from the main surface and the Sn atom concentration of an inside of the glass substrate is defined as an Sn atom concentration at a depth of 9.0 to 9.2 μm from the main surface.

In the glass substrate according to the aspect of the present invention, an Sn atom concentration gradient of a surface layer of the glass substrate is preferably $-1.0 \times 10^{23}$ atomic/cm$^4$ or more and $-1.0 \times 10^{22}$ atomic/cm$^4$ or less in the at least one of the main surfaces. The Sn atom concentration gradient of a surface layer of the glass substrate is defined as an inclination of a linear function obtained by linearly approximating a depth profile of an Sn atom concentration at a depth of 0.1-0.5 μm ($0.1 \times 10^{-4}$-$0.5 \times 10^{-4}$ cm) from the main surface.

The glass substrate according to the aspect of the present invention preferably includes an alkali-free glass including, in mol % on an oxide basis:
50 to 75% of $SiO_2$;
7 to 25% of $Al_2O_3$;
0.1 to 12% of $B_2O_3$; and
7 to 25% in total of at least one compound selected from the group consisting of MgO, CaO, SrO and BaO.

In the glass substrate according to the aspect of the present invention, the alkali-free glass preferably has a strain point of 650° C. or higher, and an average thermal expansion coefficient at 50 to 350° C. of $30 \times 10^{-7}$ to $45 \times 10^{-7}$/° C.

In the glass substrate according to the aspect of the present invention, the alkali-free glass preferably has a content of alkali metal oxides of 0.5% or lower, in mol % on an oxide basis.

The glass substrate according to the aspect of the present invention is preferably produced by a float process.

In the glass substrate according to the aspect of the present invention, the at least one of the main surfaces is preferably a polished surface formed by polishing.

In the glass substrate according to the aspect of the present invention, a texture-direction index (Stdi value) in the polished surface is preferably 0.75 or less. The Stdi value is a parameter calculated by performing leveling processing and roughness analysis with image analysis software (such as SPIP made by Image Metrology A/S) on a shape image obtained in an observation visual field of 1 μm×1 μm and the number of pixels of 256×256 by an AFM (Atomic Force Microscopy).

Another aspect of the present invention provides a black matrix substrate including the glass substrate, and a black matrix film formed on at least one of the main surfaces of the glass substrate.

Another aspect of the present invention provides a display panel including the black matrix substrate.

Advantageous Effects of Invention

Surface layer diffusion Sn atoms in the glass substrate of the present invention are Sn atoms diffused from the outside of the glass substrate, and the Sn atoms exist mainly as bivalent Sn atoms. In the glass substrate of the present invention, the surface layer diffusion Sn atom concentration is not lower than the specific range. Accordingly, bivalent Sn atoms not lower than the specific range are present in a surface layer portion of the glass substrate. Thus, it is considered that the adhesion between the glass substrate and the film can be improved. Therefore, in the glass substrate of the present invention, owing to the excellent adhesion between the glass substrate and the film, a finer pattern can be formed when the film made of resin or the like is patterned.

DESCRIPTION OF EMBODIMENTS

<Glass Substrate>

Figure 1A:
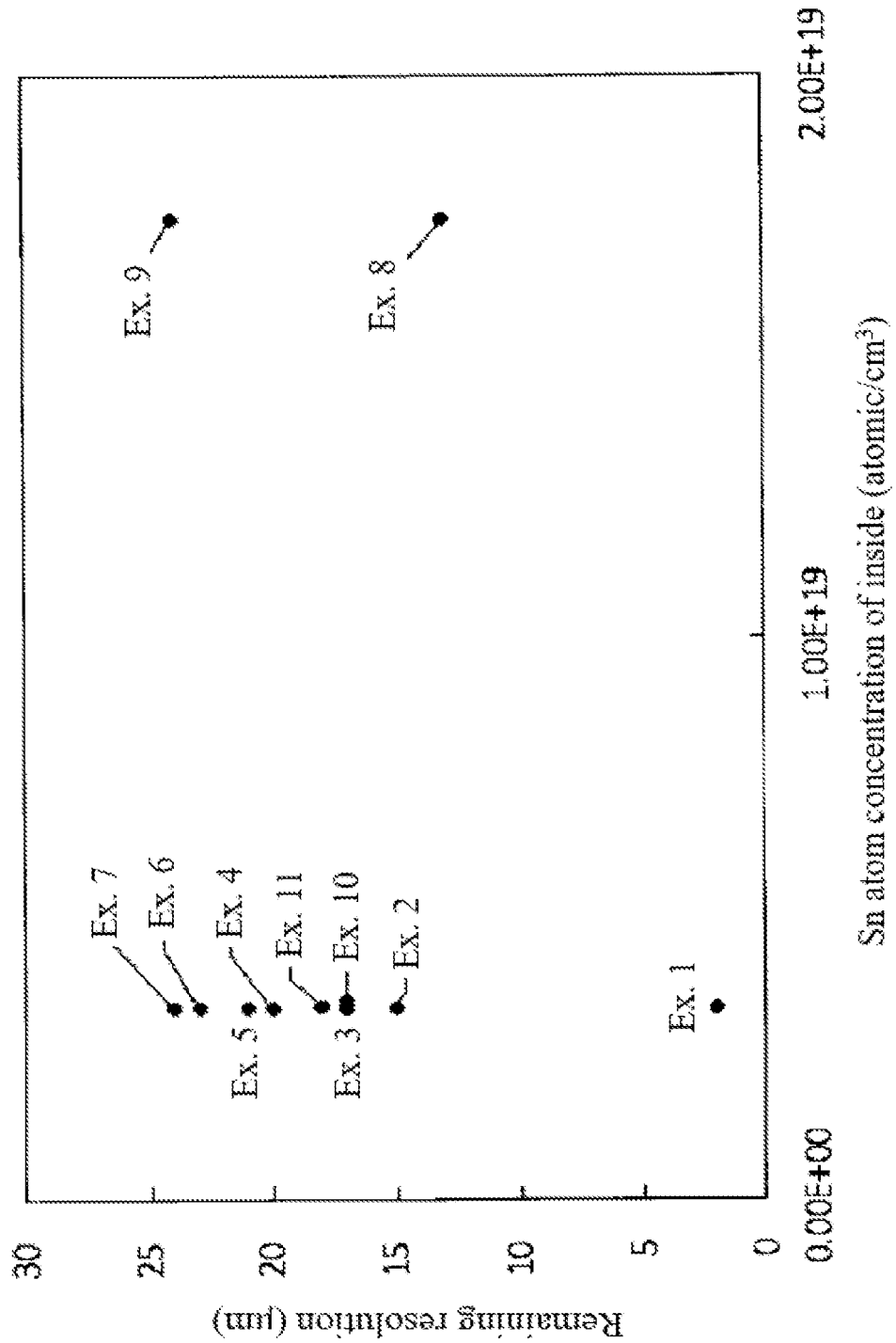
FIG. 1A is a graph showing a relation between remaining resolution and an Sn atom concentration of an inside of the glass substrate.

A glass substrate of an embodiment of the present invention will be described below in detail. In the present description, the sign "-" designating a numerical range will be used as a denotation of a range including numerical values on both sides of the sign as an upper limit value and a lower limit value of the range. The sign "-" will be used below in the same manner unless otherwise provided. In addition, the content of each component in a glass composition in the present description is expressed in mole percentage on an oxide basis unless otherwise provided.

The glass substrate of the present invention is a glass substrate including a pair of main surfaces and an end surface, and characterized in that a surface layer diffusion Sn atom concentration is $2.0 \times 10^{18}$ atomic/cm$^3$ or more and $1.4 \times 10^{19}$ atomic/cm$^3$ or less. The surface layer diffusion Sn atom concentration is obtained by subtracting an Sn atom concentration of an inside of the glass substrate from an Sn atom concentration of a surface layer of the glass substrate in at least one of the main surfaces, where the Sn atom concentration of a surface layer of the glass substrate is defined as an Sn atom concentration at a depth of 0.1-0.3 μm from the main surface and the Sn atom concentration of an inside of the glass substrate is defined as an Sn atom concentration at a depth of 9.0-9.2 μm from the main surface.

The Sn atom concentration is high in the surface layer of the glass substrate. For example, in a soda lime glass produced by float forming, Sn atoms in the surface layer of the glass substrate are bivalent. On the other hand, Sn atoms in the inside of the glass substrate are tetravalent [G. H. Frischat, C. Muller-Fildebrandt, D. Moseler, G. Heide, J. Non-Cryst, Solids 283 (2001) 246-249]. It is therefore considered that the high concentration Sn atoms in the surface layer of the glass substrate are Sn atoms diffused from the outside of the glass substrate and existing mainly as bivalent Sn atoms. It is considered that the bivalent Sn atoms are diffused into a film made of resin or the like and formed on the surface of the glass substrate to thereby improve adhesion between the glass substrate and the film. On the other hand, it is considered that the tetravalent Sn atoms function as network formers in the glass and thus are not diffused into the film.

In the glass substrate of the embodiment of the present invention, the surface layer diffusion Sn atom concentration is $2.0 \times 10^{18}$ atomic/cm$^3$ or more in the surface layer of the glass substrate. Thus the bivalent Sn atoms are diffused into the film made of resin or the like and formed on the glass substrate to thereby improve the adhesion to the film, so that a finer pattern can be formed when the film is patterned. In the glass substrate of the embodiment of the present invention, the surface layer diffusion Sn atom concentration is preferably $2.5 \times 10^{18}$ atomic/cm$^3$ or more, more preferably $3.0 \times 10^{18}$ atomic/cm$^3$ or more, particularly preferably $4.0 \times 10^{18}$ atomic/cm$^3$ or more, and most preferably $5.0 \times 10^{18}$ atomic/cm$^3$ or more.

The surface layer diffusion Sn atoms in the glass substrate of the present invention are Sn atoms diffused from the outside of the glass substrate and existing mainly as bivalent Sn atoms. It is considered that the adhesion between the glass substrate and the film is improved owing to the bivalent Sn atoms. Thus, in the glass substrate of the present invention, a finer pattern can be formed when the film made of resin or the like is patterned.

On the other hand, when the surface layer diffusion Sn atom concentration exceeds $1.4 \times 10^{19}$ atomic/cm$^3$, there is a concern that the Sn atoms emit fluorescence to cause a problem in a device production process using the glass substrate. For example, in a laser annealing step which is one of TFT processes, there is a concern that the Sn atoms absorb light radiated from an excimer laser at a wavelength of 308 nm, and emit fluorescence to conspicuously worsen a problem that TFT characteristics deteriorate. In the glass substrate of the embodiment of the present invention, the surface layer diffusion Sn atom concentration is preferably $1.2 \times 10^{19}$ atomic/cm$^3$ or less, more preferably $1.1 \times 10^{19}$ atomic/cm$^3$ or less, particularly preferably $9.5 \times 10^{18}$ atomic/cm$^3$ or less, and most preferably $8.9 \times 10^{18}$ atomic/cm$^3$ or less.

The Sn atom concentration of the surface layer of the glass substrate, the Sn atom concentration of the inside of the glass substrate, and a Sn atom concentration gradient of the surface layer of the glass substrate can be calculated from a depth profile of an Sn atom concentration (atomic/cm$^3$) measured by SIMS (Secondary Ion Mass Spectrometry). In order to determine the Sn atom concentration, a quartz glass to which $^{120}$Sn has been ion-injected is used as a standard sample. As analysis conditions of the SIMS, for example, the following conditions may be used. Incidentally, the following analysis conditions are exemplary, and they should be changed suitably in accordance with each measuring apparatus, each sample, etc. Particularly, when the plot interval in the depth profile of the Sn atom concentration is 0.05 μm or more, the following analysis conditions have to be changed to make the plot interval smaller than 0.05 μm. There is a concern that the measuring accuracy of the Sn atom concentration near the surface in the SIMS may deteriorate due to the influence of surface contamination and so on. Therefore, in order to obtain the Sn atom concentration of the surface layer of the glass substrate, a region of 0.1-0.3 μm deep from each main surface is defined as the surface layer of the glass substrate. In addition, in order to obtain the Sn atom concentration gradient of the surface layer, a region of 0.1-0.5 μm ($0.1 \times 10^{-4}$-$0.5 \times 10^{-4}$ cm) deep is used, and cm is used as a unit for the depth in the abscissa.

The Sn atom concentration of the surface layer of the glass substrate is obtained by averaging the Sn atom concentration at a depth of 0.1-0.3 μm from the main surface. Therefore, the Sn atom concentration of the surface layer of the glass substrate can also refer to as an average Sn atom concentration of the surface layer of the glass substrate.

On the other hand, the Sn atom concentration of the inside of the glass substrate is obtained by averaging the Sn atom concentration at a depth of 9.0-9.2 µm from the main surface. Therefore, the Sn atom concentration of the inside of the glass substrate can also refer to as an average Sn atom concentration of the inside of the glass substrate.

(Analysis Conditions)

Apparatus: quadrupole type secondary ion mass spectrometer (ADEPT1010) made by Ulvac-Phi Inc.
Primary ion species: $O_x^+$ (oxygen ions)
Primary ion acceleration voltage: 6 keV
Primary ion current value: 100 nA
Primary ion raster size: 80 µm square
Secondary ion detection area: 4% of primary ion raster size (the secondary ion detection area is 16 µm square when the primary ion raster size is 80 µm square)
Detected secondary ion species: $^{30}Si^+$, $^{120}Sn^+$, and $^{124}Sn^+$.

Sputtering is performed on each of the glass substrate and the standard sample as to their sheet thickness direction under the aforementioned conditions to obtain depth profiles of $^{30}Si^+$, $^{120}Sn^+$, and $^{124}Sn^+$. In each of the depth profiles, the abscissa designates sputtering time, and the ordinate designates secondary ion intensity.

Here, when the Sn atom concentration is measured in a glass substrate containing Sr, it is preferable to use the depth profile of $^{124}Sn^+$. This is because, in the glass substrate containing Sr, $^{120}Sn$ having the largest natural isotope ratio interferes with $^{88}Sr+^{16}O+^{16}O$ and the like in terms of mass, and $^{118}Sn$ having the largest natural isotope ratio next to $^{120}Sn$ interferes with $^{88}Sr+^{30}Si$ and the like in terms of mass. On the other hand, $^{124}Sn$ interferes with $^{88}Sr+^{18}O+^{18}O$ in terms of mass, but the detection intensity of $^{88}Sr+^{18}O+^{18}O$ is negligibly small in consideration of the natural isotope ratio of $^{18}O$.

The standard sample used for obtaining the relative sensitivity factor of $^{124}Sn^+$ in the present description is a quartz glass which does not contain Sr and thus does not cause mass-interference due to Sr. Therefore, $^{120}Sn$ can be measured in the standard sample. $^{120}Sn$ is ion-injected into the quartz glass to prepare the standard sample.

Next, the depth of an analysis crater formed by sputtering is measured by use of a stylus type surface shape measuring instrument such as Dektak150 made by Veeco Instruments Inc. From the depth of the analysis crater, the sputtering rate is calculated to convert the abscissa for the depth profiles of the glass substrate and the standard sample from the sputtering time to the depth. The abscissa for the depth profiles is increased in a positive direction from a depth of 0 µm toward a depth of X µm in the sheet thickness direction.

Next, the depth profile of $^{120}Sn$ in the standard sample is converted into a depth profile of $^{124}Sn^+$ in consideration of the natural existence ratio of $^{124}Sn$ to $^{120}Sn$ (5.94/32.85=0.181) so as to obtain a relative sensitivity factor of $^{124}Sn^+$. On this occasion, $^{30}Si^+$ is selected as a matrix component.

Finally, a depth profile with the Sn atom concentration (atomic/cm$^3$) as the ordinate is obtained using the depth profiles of $^{30}Si^+$ and $^{124}Sn^+$ in the glass substrate and the relative sensitivity factor of $^{124}Sn^+$. From the depth profile of the Sn atom concentration in the glass substrate, Sn atom concentration of the surface layer of the glass substrate, the Sn atom concentration of the inside of the glass substrate and the Sn atom concentration gradient are obtained. When the Sn atom concentration decreases from the surface layer of the glass substrate toward the inside of the glass substrate (in the sheet thickness direction depth), the Sn atom concentration gradient has a negative value.

When the plot interval in the depth profile of the Sn atom concentration is 0.05 µm or more, of the aforementioned analysis conditions, the primary ion acceleration voltage, the current value or the raster size has to be changed suitably to reduce the sputtering rate. For example, when the primary ion acceleration voltage is decreased, the sputtering rate is reduced.

When a patterned resin film or the like is formed on the surface of the glass substrate to make it substantially difficult to perform the SIMS analysis from the surface side of the glass substrate, the glass substrate may be polished from the opposite side to the resin film surface so that the SIMS analysis can be performed from the polished surface side to thereby obtain the depth profile of the Sn atom concentration. The sheet thickness of the glass substrate which has been polished is ideally about 10 µm. When the Sn atom concentration decreases (in the sheet thickness depth) from the surface layer (resin film surface side) toward the inside (opposite surface side to the resin film surface) in the sheet thickness direction, the Sn atom concentration gradient has a negative value.

Examples of the resin film include a resin film containing acrylic resin, epoxy resin, polyimide resin, polyester resin or the like, and a resin-made black matrix film in which a black substance such as fine carbon has been dispersed and mixed into such a resin.

In the glass substrate of the embodiment of the present invention, the Sn atom concentration gradient of the surface layer of the glass substrate is preferably $-1.0\times10^{23}$ atomic/cm$^4$ or more and $-1.0\times10^{22}$ atomic/cm$^4$ or less. The Sn atom concentration gradient of the surface layer of the glass substrate is defined as an inclination of a linear function obtained by linearly approximating a depth profile of an Sn atom concentration (atomic/cm$^3$) at a depth of 0.1-0.5 µm ($0.1\times10^{-4}$-$0.5\times10^{-4}$ cm) from the main surface.

The Sn atom concentration gradient of the surface layer of the glass substrate is more preferably $-9.6\times10^{22}$ atomic/cm$^4$ or more, particularly preferably $-9.0\times10^{22}$ atomic/cm$^4$ or more, and most preferably $-8.5\times10^{22}$ atomic/cm$^4$ or more. When the Sn atom concentration gradient of the surface layer of the glass substrate is $-1.0\times10^{22}$ atomic/cm$^4$ or less, the bivalent Sn atoms are diffused into the film formed on the surface of the glass substrate to further improve the adhesion between the glass substrate and the film. On the other hand, when the Sn atom concentration gradient of the surface layer of the glass substrate is $-1.0\times10^{23}$ atomic/cm$^4$ or more, it can be expected to reduce the problem that the Sn atoms emit fluorescence in a device production process using the glass substrate.

The glass substrate according to the embodiment of the present invention preferably includes an alkali-free glass which includes, in mol % on an oxide basis:

50 to 75% of $SiO_2$;
7 to 25% of $Al_2O_3$;
0.1 to 12% of $B_2O_3$; and
7 to 25% in total of at least one compound selected from the group consisting of MgO, CaO, SrO and BaO.

The alkali-free glass contains substantially no alkali metal oxide such as $Na_2O$, $K_2O$, or $Li_2O$. Here, the phrase "contains substantially no alkali metal oxide" means not to contain any alkali metal oxide but unavoidable impurities mixed from raw materials or the like. That is, the alkali-free glass means a glass where no alkali metal oxide is intentionally contained.

The content of $SiO_2$ is preferably 50% or higher, more preferably 55% or higher, even more preferably 60% or higher, particularly preferably 62% or higher, and most preferably 64% or higher. On the other hand, the content thereof is preferably 75% or lower, more preferably 72% or lower, even more preferably 70% or lower, and particularly preferably 68% or lower. When the content of $SiO_2$ is set at 50% or higher, it is possible to prevent reduction in acid resistance, increase in density, decrease in strain point, increase in linear expansion coefficient, and reduction in Young's modulus. When the content of $SiO_2$ is set at 75% or lower, it is possible to prevent increase in high-temperature viscosity and reduction in meltability.

The content of $Al_2O_3$ is preferably 7% or higher, more preferably 9% or higher, even more preferably 10% or higher, and particularly preferably 11% or higher. On the other hand, the content is preferably 25% or lower, more preferably 20% or lower, even more preferably 17% or lower, particularly preferably 15% or lower, and most preferably 13% or lower. When the content of $Al_2O_3$ is set at 7% or higher, it is possible to prevent devitrification temperature from extremely increasing to easily cause devitrification in the glass. When the content of $Al_2O_3$ is set at 25% or lower, it is possible to prevent increase in viscosity, increase in melting temperature, and contamination of bubbles.

The content of $B_2O_3$ is preferably 0.1% or higher, more preferably 1% or higher, and even more preferably 3% or higher. On the other hand, the content is preferably 12% or lower, more preferably 10% or lower, and even more preferably 9% or lower. When the content of $B_2O_3$ is set at 0.1% or higher, it is possible to improve the dissolution reactivity of the glass and decrease the devitrification temperature. When the content of $B_2O_3$ is set at 12% or lower, it is possible to improve the acid resistance.

The total content (MgO+CaO+SrO+BaO) of MgO, CaO, SrO and BaO is preferably 7% or higher, more preferably 10% or higher, even more preferably 11% or higher, particularly preferably 12% or higher, and most preferably 15% or higher. On the other hand, the total content is preferably 25% or lower, more preferably 22% or lower, even more preferably 21% or lower, particularly preferably 20% or lower, and most preferably 19.5% or lower. When MgO+CaO+SrO+BaO is set at 7% or higher, the meltability of the glass is improved. When MgO+CaO+SrO+BaO is set at 25% or lower, the density and the thermal expansion coefficient of the glass decrease.

MgO is a component which decreases the density and the thermal expansion coefficient of the alkali-free glass to thereby improve the meltability without excessively decreasing the strain point. When MgO is contained, the content of MgO is preferably 1.5% or higher, more preferably 3% or higher, even more preferably 4% or higher, particularly preferably 5% or higher, and most preferably 7% or higher, in order to express the aforementioned effect. On the other hand, in order to inhibit phase splitting in the alkali-free glass and improve the devitrification characteristic, the acid resistance and the BHF (buffered hydrofluoric acid) resistance, the content of MgO is preferably 15% or lower, more preferably 12% or lower, and even more preferably 10% or lower.

CaO is a component which decreases the density and the thermal expansion coefficient of the alkali-free glass to thereby improve the meltability without excessively decreasing the strain point. When CaO is contained, the content of CaO is preferably 3% or higher, more preferably 5% or higher, and even more preferably 7% or higher, in order to express the aforementioned effect. On the other hand, in order to improve the devitrification characteristic, the acid resistance and the alkali resistance of the alkali-free glass and to decrease the density and the thermal expansion coefficient, the content of CaO is preferably 15% or lower, more preferably 12% or lower, and even more preferably 10% or lower.

SrO is a component which decreases the density and the thermal expansion coefficient of the alkali-free glass to thereby improve the meltability without excessively decreasing the strain point. When SrO is contained, the content of SrO is preferably 0.5% or higher, more preferably 1% or higher, and even more preferably 3% or higher, in order to express the aforementioned effect. On the other hand, in order to improve the devitrification characteristic, the acid resistance and the alkali resistance of the alkali-free glass and to decrease the density and the thermal expansion coefficient, the content of SrO is preferably 10% or lower, more preferably 8% or lower, and even more preferably 6% or lower.

BaO is not an essential component, but may be contained in order to inhibit phase splitting in the alkali-free glass and to improve the devitrification characteristic and the chemical resistance. However, when plenty of BaO is contained, there is a tendency that the specific gravity increases, the Young's modulus decreases, and the average thermal expansion coefficient increases excessively. Therefore, the content of BaO is preferably 5% or lower, more preferably 1% or lower, and even more preferably 0.5% or lower. Particularly preferably, the alkali-free glass of the present invention contains substantially no BaO.

The phrase "contains substantially no" in the present description means not to contain the component but unavoidable impurities mixed from raw materials or the like, that is, means that the component is not intentionally contained. In the present invention, the phrase "contains substantially no BaO" means that the content of BaO is, for example, 0.3% or lower, and preferably 0.2% or lower.

Examples of the composition of the alkali-free glass used as the glass substrate of the embodiment of the present invention include:

(1) a glass including 64-67% of $SiO_2$, 10-12% of $Al_2O_3$, 7-9% of $B_2O_3$, 5-7% of MgO, 4-6% of CaO, 4-6% of SrO, and 0-1% of BaO, in which MgO+CaO+SrO+BaO is 15-17%;

(2) a glass including 65-69% of $SiO_2$, 11-14% of $Al_2O_3$, 0.5-2% of $B_2O_3$, 8-10% of MgO, 4-6% of CaO, 3-5% of SrO, and 0-1% of BaO, in which MgO+CaO+SrO+BaO is 18-20%;

(3) a glass including 63-69% of $SiO_2$, 10-16% of $Al_2O_3$, 0.5-3.5% of $B_2O_3$, 7-13% of MgO, 5-10% of CaO, 0.5-4% of SrO, and 0-3% of BaO, in which MgO+CaO+SrO+BaO is 17-22%; and (4) a glass including 65-69% of $SiO_2$, 9-13% of $Al_2O_3$, 8-12% of $B_2O_3$, 0-4% of MgO, 7-11% of CaO, 0-3% of SrO, 0-1% of BaO, and 0-1% of $SnO_2$, in which MgO+CaO+SrO+BaO is 10-14%.

In the glass substrate of the embodiment of the present invention, the alkali-free glass has a content of alkali metal oxides being preferably 0.5% or lower, more preferably 0.2% or lower, even more preferably 0.1% or lower, particularly preferably 0.08% or lower, and most preferably 0.05% or lower. When the content of alkali metal oxides is set at 0.5% or lower, alkali metal ions can be inhibited from being dispersed into the film such as the resin film formed on the glass substrate to thereby deteriorate the film characteristic. Examples of the alkali metal oxides include $Na_2O$, $K_2O$, and $Li_2O$.

In the glass substrate of the embodiment of the present invention, it is preferable that the alkali-free glass has a strain point of 650° C. or higher, and an average thermal expansion coefficient of $30 \times 10^{-7}$-$45 \times 10^{-7}$/° C. at 50-350° C.

The strain point of the alkali-free glass is preferably 650° C. or higher, more preferably 670° C. or higher, and even more preferably 700° C. or higher. When the strain point of the alkali-free glass is set at 650° C. or higher, thermal deformation or dimensional variation can be inhibited in manufacturing of a flat panel display or the like. The upper limit of the strain point is not limited, but it is typically 750° C. or lower. The strain point is measured by a fiber elongation method according to JIS R3103-2 (2001).

The average thermal expansion coefficient of the alkali-free glass at 50-350° C. is preferably $30 \times 10^{-7}$/° C. or more, more preferably $32 \times 10^{-7}$/° C. or more, and even more preferably $35 \times 10^{-7}$/° C. or more. On the other hand, the average thermal expansion coefficient is preferably $45 \times 10^{-7}$/° C. or less, more preferably $43 \times 10^{-7}$/° C. or less, and even more preferably $40 \times 10^{-7}$/° C. or less. When the average thermal expansion coefficient is $30 \times 10^{-7}$/° C. or more, the difference in the average thermal expansion coefficient from the film such as the resin film formed on the glass substrate can be prevented from excessively increasing. When the average thermal expansion coefficient is $45 \times 10^{-7}$/° C. or less, the thermal shock resistance can be inhibited from excessively decreasing.

The average thermal expansion coefficient at 50-350° C. is measured as follows. After the glass is kept at an annealing point for 30 minutes, the glass is cooled at a rate of 60° C./min to be annealed. Next, as for the annealed glass, a curve between an amount of linear expansion and a temperature is measured from a room temperature to 400° C. From the measured curve, an average linear expansion coefficient at 50-350° C. is calculated as an average thermal expansion coefficient.

The glass substrate of the embodiment of the present invention is preferably a float glass produced by a float process. By use of the float process, the glass substrate can be enlarged easily and made into a glass substrate excellent in flatness and homogeneity.

In the glass substrate of the embodiment of the present invention, at least one main surface is preferably a polished surface which is formed by polishing. When the main surface is formed into a polished surface, foreign matters (for example, foreign matter flaws caused by adhesion of tin) adhering to the surface of the glass substrate or scratches can be eliminated to inhibit a problem (such as chipping of a pattern, a protrusion, a pinhole, or disconnection) occurring when the film such as the resin film formed on the surface of the glass substrate is patterned. Thus, a finer pattern can be formed.

In the glass substrate of the embodiment of the present invention, a texture-direction index (Stdi value) in the polished surface is preferably 0.75 or less. The Stdi value is a parameter calculated by performing leveling processing and roughness analysis with image analysis software (such as SPIP made by Image Metrology A/S) on a shape image obtained with an observation visual field 1 μm square and a number of pixels measuring 256 by 256 by an AFM (Atomic Force Microscopy).

The Stdi value calculated by the image analysis software based on the shape image obtained with the observation visual field 1 μm square and the number of pixels measuring 256 by 256 by the AFM is preferably 0.75 or less, more preferably 0.74 or less, particularly preferably 0.72 or less, and most preferably 0.70 or less. The lower limit of the Stdi value is not particularly limited, but it is typically 0.20 or more. When the Stdi value is 0.75 or less, foreign matters adhering to the surface can be satisfactorily eliminated from the glass substrate by polishing.

The Stdi value is an index indicating dominancy or non-dominancy as to the orientation of the texture (the characteristic or state provided uniformly in the processed surface) formed in the glass surface. The Stdi value takes a value between 0 and 1. When the texture has a dominant orientation, the Stdi value approaches 0. On the contrary, when the texture has no orientation, the Stdi value approaches 1. That is, when a texture having orientation is formed in the glass surface by polishing, the Stdi value approaches 0. The Stdi value can be obtained by the image analysis software (such as SPIP made by Image Metrology A/S) applied to the shape image obtained by the AFM.

The sheet thickness of the glass substrate of the embodiment of the present invention is not particularly limited. However, the thickness is preferably 0.7 mm or less in order to achieve reduction in weight. The thickness of the alkali-free glass of the present invention is more preferably 0.65 mm or less, even more preferably 0.55 mm or less, particularly preferably 0.45 mm or less, and most preferably 0.4 mm or less. The thickness may be set at 0.1 mm or less, or at 0.05 mm or less. However, in order to prevent the glass substrate from bending due to its own weight, the thickness is preferably 0.1 mm or more, and more preferably 0.2 mm or more.

In the glass substrate of the embodiment of the present invention, a fluorescence emission intensity difference ($\Delta I_{400}$) at a wavelength of 400 nm between before and after elimination of the surface layer is preferably 90 or less. $\Delta I_{400}$ means a difference ($Is_{400}$–$Ib_{400}$) between fluorescence emission intensity ($Ib_{400}$) at the wavelength of 400 nm in the main surface of the glass substrate where the main surface of the glass substrate has been removed by 8 μm in the thickness direction and fluorescence emission intensity ($Is_{400}$) at the wavelength of 400 nm in the main surface where the surface layer of the main surface of the glass substrate has not yet been removed.

When the fluorescence emission intensity difference ($\Delta I_{400}$) at the wavelength of 400 nm between before and after the elimination of the surface layer is 90 or less, it can be expected to reduce the problem caused by fluorescence emission of the Sn atoms in a device production process using the glass substrate. The fluorescence emission intensity difference ($\Delta I_{400}$) at the wavelength of 400 nm is more preferably 85 or less, even more preferably 80 or less, particularly preferably 75 or less, and most preferably 70 or less.

In the case where the fluorescence emission intensity difference ($\Delta I_{400}$) at the wavelength of 400 nm is too small, it means that the amount of the Sn atoms diffused into the surface layer of the glass substrate is small. Thus, there is a concern that the adhesion between the glass substrate and the film formed on the surface thereof may deteriorate. Therefore, the fluorescence emission intensity difference ($\Delta I_{400}$) at the wavelength of 400 nm is preferably 5 or more, more preferably 10 or more, even more preferably 20 or more, particularly preferably 25 or more, and most preferably 30 or more.

The fluorescence emission intensity is measured within a range of 300-600 nm by use of a fluorescence spectrophotometer (such as Model: F-7000 made by Hitachi High-Tech Corporation). The fluorescence emission intensity is measured under conditions including an exciting light wavelength of 240 nm, a tube voltage of 350 V, an excitation-side slit width of 10 nm, and a fluorescence-side slit width of 10 nm, with a filter on fluorescence-side for cutting light at a wavelength of 295 nm or less. In order to stabilize the intensity of a light source and the sensitivity of a detector, the fluorescence emission intensity is measured after 1 hour or more has passed since starting-up of the fluorescence spectrophotometer. On the aforementioned measuring conditions, the fluorescence emission intensity is in arbitrary unit.

<Method for Manufacturing Glass Substrate>

The glass substrate of the embodiment of the present invention can be, for example, manufactured by the following method. A glass raw material including a refining agent such as $SnO_2$ if necessary is melted, and the molten glass is formed into a sheet-like glass ribbon by a float process, a fusion process or the like. Then a piece having predetermined dimensions is cut out from the glass ribbon to manufacture the glass substrate. In addition, the glass formed into a sheet-like shape is polished and washed according to the need.

In the method for manufacturing the glass substrate of the embodiment of the present invention, the glass substrate is formed by the float process so that molten tin and a glass component are diffused into each other during the float forming. Thus, bivalent Sn atoms are contained in the glass surface so that the adhesion between the glass substrate and the film such as the resin film formed on the surface of the glass substrate can be improved. Therefore, it is preferable that the method for manufacturing the glass substrate of the embodiment of the present invention includes a forming step using the float process.

The method for manufacturing the glass substrate of the embodiment of the present invention will be described below on the assumption that it includes the forming step using the float process, a polishing step, and a washing step of washing the polished glass substrate.

In the glass substrate of the embodiment of the present invention, it is preferable that foreign matters adhering to the surface of the glass substrate are eliminated satisfactorily by polishing as described above. On the other hand, in order to improve productivity of the glass substrate, it is preferable that the polishing amount in the polishing step is reduced. Therefore, it is preferable that the glass substrate which has not yet been polished is a glass having the amount of foreign matters adhering to the surface thereof being so small that the polishing amount in the polishing step can be reduced.

The glass having the small amount of foreign matters adhering to the surface thereof can be produced by suitably adjusting the conditions in the forming step using the float process. Specifically, for example, the temperature of glass melt in the entrance of a float bath is made preferably 1400° C. or lower, more preferably 1100° C. or higher and 1400° C. or lower at maximum (maximum temperature is within a range of 1400-1100° C.), even more preferably 1350° C. or lower, further more preferably 1150° C. or higher and 1350° C. or lower at maximum (maximum temperature is within a range of 1150-1350° C.), particularly preferably 1320° C. or lower, and most preferably 1180° C. or higher and 1320° C. or lower at maximum (maximum temperature is within a range of 1180-1320° C.). When the temperature of the glass melt in the entrance of the float bath is set to be 1400° C. or lower, foreign matters such as defects caused by molten tin hardly adhere to the glass surface. Thus, a glass substrate from which foreign matters adhering to the surface have been eliminated satisfactorily can be obtained by a reduced polishing amount.

In the polishing step, the surface of the glass substrate is, for example, polished by use of a polishing pad and with a polishing agent (slurry) including abrasive grains. The abrasive grains included in the polishing agent are not particularly limited. Examples of the abrasive grains include silica grains, alumina grains, cerium oxide grains, titania grains, zirconia grains, and manganese oxide grains. In terms of polishing efficiency, the cerium oxide grains are preferred. The average grain size of the abrasive grains is, for example, in a range of 0.8-1.5 μm. Owing to such a polishing step, the Stdi value measured by the AFM in the surface of the glass substrate can be preferably made 0.75 or less.

In order to set the surface layer diffusion Sn concentration at a predetermined concentration in the surface of the glass substrate, the polishing amount in the polishing step is preferably less than 2.0 μm, more preferably 1.8 μm or less, even more preferably 1.5 μm or less, further more preferably 1.0 μm or less, particularly preferably 0.7 μm or less, and most preferably 0.5 μm or less.

In the washing step, the surface of the glass substrate is washed with an acidic cleaning solution, and then washed with an alkaline cleaning solution according to the need. In a case where the glass substrate is a glass substrate made of an aluminoborosilicate glass for a liquid crystal display (LCD) or the like, when the glass substrate is washed with an acidic cleaning solution, a glass component such as aluminum ions escapes so that a high-hydrophilic layer containing excessive OH groups is formed on the surface of the glass substrate. Thus, due to the layer, the adhesion between the film such as the resin film and the glass substrate may deteriorate.

In the glass substrate of the embodiment of the present invention, the surface layer diffusion Sn atom concentration is $2.0 \times 10^{18}$ atomic/cm$^3$ or more in the surface layer of the glass substrate. Thus, it is possible to improve the adhesion to the film of resin or the like formed on the glass substrate. Therefore, even if the glass component such as aluminum ions have escaped from the surface of the glass substrate due to washing with an acidic cleaning solution, the glass substrate can be provided as a glass substrate excellent in adhesion to the film of resin or the like. For the glass substrate of the embodiment of the present invention, the surface thereof can be washed suitably with an acidic or alkaline cleaning solution so that foreign matters adhering to the surface can be reduced satisfactorily. Thus, it is possible to provide a glass substrate excellent in cleanliness.

Preferably the glass substrate of the embodiment of the present invention is a glass substrate made of silica glass containing aluminum, in which a ΔAl/Si value exceeds 0.26. The ΔAl/Si value is a value obtained by subtracting an Al/Si value in the surface of the glass substrate from an Al/Si value in the inside of the glass substrate. Each Al/Si value is a value obtained by dividing an Al atom concentration (atomic %) measured by X-ray photoelectron spectroscopy by an Si atom concentration (atomic %).

When the ΔAl/Si value exceeds 0.26, the surface of the glass substrate can be washed suitably with an acidic or alkaline cleaning solution. Thus, it is possible to provide a glass substrate in which adhering foreign matters have been reduced satisfactorily, and which is excellent in cleanliness. The ΔAl/Si value is more preferably 0.27 or more.

Preferably the method for manufacturing the glass substrate of the embodiment of the present invention includes the forming step using the float process, in which the surface layer diffusion Sn concentration of the glass substrate is set at a predetermined concentration so that the adhesion between the film such as the resin film and the glass substrate can be improved.

The washing method is not particularly limited as long as it is a method for washing the glass substrate with a cleaning solution which is brought into direct contact with the surface of the glass substrate. Examples of the washing method include scrub washing, shower washing (jet washing), and dip washing (immersion washing). The temperature of the cleaning solution is not particularly limited. The cleaning solution is used at room temperature (15° C.) to 95° C. When the temperature exceeds 95° C., there is a concern that water in the cleaning solution may boil to make the washing operation inconvenient.

Examples of organic acid contained in the acidic cleaning solution include organic carboxylic acid such as ascorbic acid or citric acid, and organic phosphonic acid. However, the organic acid is not limited to those acids. Together with those organic acids, inorganic acid (such as sulfuric acid, phosphoric acid, nitric acid, hydrofluoric acid, or hydrochloric acid) may be added to the cleaning solution. The inorganic acid may be used alone. When the inorganic acid is used, salt of the inorganic acid may be added together with the inorganic acid in order to inhibit fluctuation in pH.

A compound such as organic carboxylic acid or organic phosphonic acid having a chelate effect may be contained in the cleaning solution in terms of washability. On the other hand, there is a possibility that the compound promotes the component such as aluminum to escape from the glass. Therefore, it is preferable that the cleaning solution does not contain such a compound.

Here, examples of the organic carboxylic acid having a chelate effect include a dicarboxylic acid based chelating agent, a tricarboxylic acid based chelating agent, a gluconic acid based chelating agent, a nitrilotriacetic acid based chelating agent, and an iminosuccinic acid based chelating agent.

The organic phosphonic acid is an organic compound having a structure in which phosphonic acid groups expressed by the formula —P(=O)(OH)$_2$ have been bonded to carbon atoms. The number of phosphonic acid groups expressed by the aforementioned formula in one molecule of the organic phosphonic acid is preferably 2 or more, more preferably 2-8, and particularly preferably 2-4.

A compound having a structure in which hydrogen atoms bonded to carbon atoms in hydrocarbons that may have substituents have been substituted to phosphonic acid groups, and a compound having a structure in which hydrogen atoms bonded to nitrogen atoms in ammonia or amines have been substituted to methylenephosphonic acid groups expressed by —CH$_2$—P(=O)(OH)$_2$ are preferred as the organic phosphonic acid. Specific examples of the organic phosphonic acid include methyl diphosphonic acid.

The alkaline cleaning solution contains a base, and may contain a chelating agent or a surfactant other than the base. The chelating agent may be contained in the cleaning solution in terms of washability. There is a possibility that the chelating agent promotes the aluminum component to escape from the glass.

Examples of the base contained in the alkaline cleaning solution include an alkali metal compound such as alkali metal hydroxide or alkali metal carbonate, amines, or quaternary ammonium hydroxide. Alkali metal hydroxide such as potassium hydroxide or sodium hydroxide is preferred as the base.

Examples of the chelating agent include ethylenediaminetetraacetic acid based chelating agent, a gluconic acid based chelating agent, a nitrilotriacetic acid based chelating agent, and an iminosuccinic acid based chelating agent. Particularly the ethylenediaminetetraacetic acid based chelating agent is preferred. A nonion surfactant is preferred as the surfactant.

After the washing step, drying may be performed. Examples of the drying method include a method of blowing hot air, and a method of blowing compressed air.

When the film such as the resin film is formed on the surface of the glass substrate obtained thus, it is possible to manufacture a product such as a color liquid crystal display panel, which is high in adhesion to the film, and good in yield. For example, when the color liquid crystal display panel is manufactured, a black matrix film, a color filter layer, an overcoat layer, and an ITO transparent conductive film are provided sequentially on at least one of the main surfaces of the glass substrate.

Here, as the black matrix, it is preferable to use a resin in which a black substance such as fine carbon powder has been dispersed and mixed into acrylic resin, epoxy resin, polyimide resin, polyester resin or the like, which enables a pattern formation with high accuracy. The black matrix film is formed by known pattern formation. In addition, the color filter layer may be formed with a known material for use in a color liquid crystal display by a known method such as a pigment dispersion method, a film transfer method, a dyeing method, a printing method, or an electrodeposition method.

In addition, the overcoat layer is provided for flattening irregularities generated in borders among R, G and B of the color filter layer provided on the black matrix film. The overcoat layer may be formed by a known method out of acrylic resin, epoxy resin, polyimide resin or the like. Further, the ITO transparent electrode film may be formed by a known method.

Since the liquid display panel obtained thus uses the aforementioned glass substrate of the present invention, the film such as the black matrix film is hardly separated from the glass substrate during manufacturing thereof and during use thereof. Thus, the product yield is good, and the performance is stabilized.

EXAMPLES

The present invention will be described below along its examples. However, the present invention is not limited by the examples. As for measuring results in tables, blanks show unmeasured items.

[Evaluation Method]
[Remaining Resolution]

The adhesion between the black matrix film which was a resin film and the glass substrate was evaluated in the following procedure. The adhesion was evaluated using a photosensitive black matrix forming resin composition containing a binder resin, a crosslinking agent, a photopolymerization initiator, a silane coupling agent, and carbon black.

Next, the surface of the glass substrate which had been washed was coated (spin-coated) with the photosensitive black matrix forming resin composition by use of a spin coater. After that, the glass substrate was heated and dried at 85° C. for 90 seconds by use of a hot plate. Thus, a coating film was formed.

After that, the coating film was exposed to light (illuminance: 30 mW/cm², exposure amount: 30 mJ/cm², exposure gap: 50 μm) through a photomask by use of an exposure apparatus, and developed with a 0.08% KOH aqueous solution for 70 seconds by use of a development apparatus. In this evaluation, evaluation was performed on severe development conditions where the KOH concentration was high and the development time was long. Successively, the surface of the glass substrate was washed with pure water. Thus, a pattern of a resin black matrix film was formed on the surface of the glass substrate.

The photomask had the following four types of pattern shapes of L1 to L4. The line width was changed from one to another in each type by each 1 μm, and 105 kinds of patterns were provided in total.

L1: 25 linear patterns (whose line widths were variable within a range of 1 to 25 μm) provided in one block (2835 μm by 2000 μm) at a pattern interval of 100 μm L2: 30 linear patterns (whose line widths were variable within a range of 1 to 30 μm) provided in one block (2952.6 μm by 2000 μm) at a pattern interval of 50 μm L3: 25 linear patterns (whose line widths were variable within a range of 1 to 25 μm) provided in one block (2682.5 μm by 2000 μm) at a pattern interval of 200 μm L4: 25 short linear patterns (whose line widths were variable within a range of 1 to 25 μm) provided in one block (2682.5 μm by 2000 μm) at a pattern interval of 200 μm The glass substrate which had been washed with pure water was observed by a laser microscope (apparatus name: VK-9510 made by Keyence Corporation). Mask line widths (hereinafter referred to as remaining resolution) at which patterns of the resin black matrix film remained on the glass substrate were examined in each of the four types of pattern shapes L1 to L4. Then, an average of the remaining resolution was obtained for each of the four types of pattern shapes. The adhesion of the resin black matrix film formed on the glass substrate which had been washed is higher as the value of the remaining resolution is smaller.

[Surface Cleanliness]

The surface of the glass substrate evaluated as to the remaining resolution was observed by the laser microscope, and foreign matters adhering to the surface and pattern defects (chipping, a protruding defect, and a pinhole) were evaluated. The evaluation was performed as follows:

A: the number of places having the foreign matters adhering to the surface or the pattern defect was 5 or less; and B: the number of places having the foreign matters adhering to the surface or the pattern defect was 6 or more The pattern defects are associated with the cleanliness of the glass substrate surface. The pattern defects are generated when the glass substrate surface has not been washed satisfactorily or when plenty of foreign matters adhere to the glass substrate surface.

[SIMS Measurement]

The depth profile of the Sn atom concentration (atomic/cm³) was obtained by the aforementioned SIMS measurement, and the surface layer diffusion Sn atom concentration (atomic/cm³) was calculated. The surface layer diffusion Sn atom concentration was obtained by measuring the Sn atom concentration of the surface layer [Sn atom concentration (atomic/cm³) at depth of 0.1-0.3 μm] and the Sn atom concentration of the inside [Sn atom concentration (atomic/cm³) at depth of 9.0-9.2 μm] and subtracting the Sn atom concentration of the inside from the Sn atom concentration of the surface layer.

In addition, as the Sn atom concentration gradient of the surface layer, the depth profile of the Sn atom concentration (atomic/cm³) at a depth of 0.1-0.5 μm ($0.1 \times 10^{-4}$-$0.5 \times 10^{-4}$ cm) from the main surface was linearly approximated, and the inclination of the linear function was obtained. The plot interval in the depth profile of the Sn atom concentration was about 0.04 μm. In addition, when the Sn atom concentration decreases (in the sheet thickness depth) from the surface layer toward the inside in the sheet thickness direction, the Sn atom concentration gradient has a negative value. The unit of the Sn atom concentration gradient is defined as atomic/cm⁴.

[Sn Relative Concentration]

Photoelectron spectra corresponding to an $Sn_{3d5/2}$ orbit and an $Si_{2p}$ orbit were measured by XPS (X-ray Photoelectron Spectroscopy). Background was eliminated from the photoelectron spectra, and areas of photoelectron peaks corresponding to the $Sn_{3d5/2}$ orbit and the $Si_{2p}$ orbit were obtained. The obtained areas were regarded as the number of photoelectrons $N_{Sn}$ per unit time derived from the $Sn_{3d5/2}$ orbit and the number of photoelectrons $N_{Si}$ per unit time derived from the $Si_{2p}$ orbit, respectively. The elimination of the background was performed by the same function applied to photoelectron peaks corresponding to the $Sn_{3d5/2}$ orbit and the $Si_{2p}$ orbit.

An Sn relative concentration $C_0$ was calculated by the following expression using $N_{Sn}$ and $N_{Si}$.

$$C_0 = (N_{Sn}/486.028)/[(N_{Si}/34.52)+(N_{Sn}/486.028)] = N_{Sn}/(14.08 N_{Si} + N_{Sn})$$

Here, 486.028 and 34.52 are relative sensitivity factors for Sn and Si respectively.

Measurement conditions of the XPS were set as follows.

Measurement apparatus: Quantera-SXM made by Ulvac-Phi Inc.

Monitor peak: $N_{Si}[Si_{2p}]$, $N_{Sn}[Sn_{3d5/2}]$

Detection angle (angle between sample surface and detector): 45°

Analysis software [MultiPak (trademark) made by Ulvac-Phi Inc.] was used for analysis of the XPS spectra. A Shirley method was applied to the subtraction of the background from the spectra.

[ΔAl/Si Value]

Al atom concentrations and Si atom concentrations were measured in the inside of the glass substrate and in the surface of the glass substrate by XPS (X-ray Photoelectron Spectroscopy). The ratio of the Al atom concentration to the Si atom concentration in the inside of the glass substrate was defined as an inside Al/Si value (atom concentration ratio). The ratio of the Al atom concentration to the Si atom concentration in the surface of the glass substrate was defined as a surface Al/Si value (atom concentration ratio). A value obtained by subtracting the surface Al/Si value from the inside Al/Si value was defined as a ΔAl/Si value (atom concentration ratio). The procedure of measuring the surface Al/Si value and the inside Al/Si value will be described below.

<Measurement of Surface Al/Si Value>

The Al atom concentration and the Si atom concentration in the main surface of the glass substrate were measured by use of XPS to obtain the Al/Si value (atom concentration ratio). The measurement was performed by use of PH15500 made by Ulvac-Phi Inc. using peaks of Si(2p) and Al(2p) under conditions including a pass energy of 117.4 eV, an energy step of 0.5 eV/step, and a detection angle (angle between sample surface and detector) of 15°. The analysis software MultiPak was used for analysis of spectra. The Shirley method was applied to the subtraction of the background from the spectra.

<Measurement of Inside Al/Si Value>

After the surface Al/Si value was measured in the aforementioned manner, depth-direction distributions of the Al atom concentration and the Si atom concentration were measured by XPS using C60 ion sputtering. The same XPS measuring apparatus and the analysis software as those for the measurement of the surface Al/Si were used. In addition, the Shirley method was applied to the subtraction of the background from spectra. Measuring conditions include a path energy of 117.4 eV, an energy step of 0.5 eV/step, monitor peaks of Si(2P) and Al(2p), and a detection angle of 75°. The sputtering interval was set at 5 minutes. The Al atom concentration and the Si atom concentration in the bottom portion of a formed crater were measured whenever sputtering was performed for 5 minutes. Such measurement was performed until reaching a region where the Al atom concentration and the Si atom concentration were constant in the depth direction. The ratio of the Al concentration to the Si concentration in the constant concentration region was regarded as the inside Al/Si value (atom concentration ratio).

[Texture-Direction Index (Stdi Value)]

A shape image was obtained on the following conditions using an AFM (model: Multimode VIII SPM, Nanoscope V controller) made by Bruker Japan K.K.

Measurement mode: Tapping
Scan speed: 1 Hz
Cantilever: AC160TS made by Olympus Corporation
Observation visual field: 1 μm×1 μm
Resolution: 256×256 pixels After that, leveling processing was performed on the shape image by use of image analysis software (SPIP image analysis software version 6.2.6 made by Image Metrology A/S), and a texture-direction index (Stdi value) was obtained by roughness analysis.

<Measurement of Fluorescence Emission Spectrum>

Fluorescence emission intensity was measured within a range of 300-600 nm by use of a fluorescence spectrophotometer (model: F-7000 made by Hitachi High-Tech Corporation). The fluorescence emission intensity was measured under conditions including an exciting light wavelength of 240 nm, a tube voltage of 350 V, an excitation-side slit width of 10 nm, and a fluorescence-side slit width of 10 nm, with a filter on fluorescence-side for cutting light at a wavelength of 295 nm or less. In order to stabilize the intensity of a light source and the sensitivity of a detector, the fluorescence emission intensity was measured after 1 hour or more had passed since starting-up of the fluorescence spectrophotometer. On the aforementioned measuring conditions, the fluorescence emission intensity was in arbitrary unit. The fluorescence emission intensity of each sample was obtained by regression of measured values at several points. The accuracy of polishing in each sample was within a range of 0±0.4 μm.

Fluorescence emission intensity ($Ib_{400}$) at a wavelength of 400 nm in the main surface of the glass substrate where the main surface of the glass substrate had been eliminated by 8 μm in the thickness direction and fluorescence emission intensity ($Is_{400}$) at the wavelength of 400 nm in the main surface where the main surface of the glass substrate had not yet been eliminated were measured. In addition, a difference ($Is_{400}-Ib_{400}$) in fluorescence emission intensity at the wavelength of 400 nm between before and after the main surface of the glass substrate was eliminated in the thickness direction, that is, between before and after the elimination of the surface layer was obtained. The obtained difference was defined as a fluorescence emission intensity difference ($\Delta I_{400}$) at the wavelength of 400 nm. Specifically, for example, $\Delta I_{400}$ in a case where "polishing thickness (m)" was "8" corresponds to a "difference between fluorescence emission intensity of the glass substrate with 8 μm thickness (after the elimination) and fluorescence emission intensity of the glass substrate with 16 μm thickness (before the elimination).

Table 1 shows intended compositions of examples in mol % on an oxide basis, and Table 2 shows results of the examples. In Table 2, Example 1 is a reference example, Examples 2-5, 8, 10 and 11 are working examples, and Examples 6, 7 and 9 are comparative examples.

[Manufacturing of Glass Substrate]

Raw materials of respective components were prepared to obtain each intended composition shown in Table 1, melted in a continuous melting furnace, and formed into a sheet by a float process. Thus, an alkali-free glass substrate was obtained. A surface of the glass substrate was polished to obtain a polishing thickness shown in Table 2 by use of a polishing pad and a polishing agent containing cerium oxide grains having an average grain size of 0.8-1.0 μm (trade-name: SHOROX A10 made by Showa Denko K.K.).

An unpolished glass substrate (Example 1) and polished glass substrates (Examples 2-11) were scrub-washed with a rotary brush made of PVA while an acidic cleaning solution was blown at a flow rate of 25 L per minute. As a cleaning solution used in the washing step, the acidic cleaning solution was diluted with water until pH reached 2.7. The temperature of the cleaning solution was set at 25° C., and the scrub time was set at 3-5 seconds.

Figure 1B:
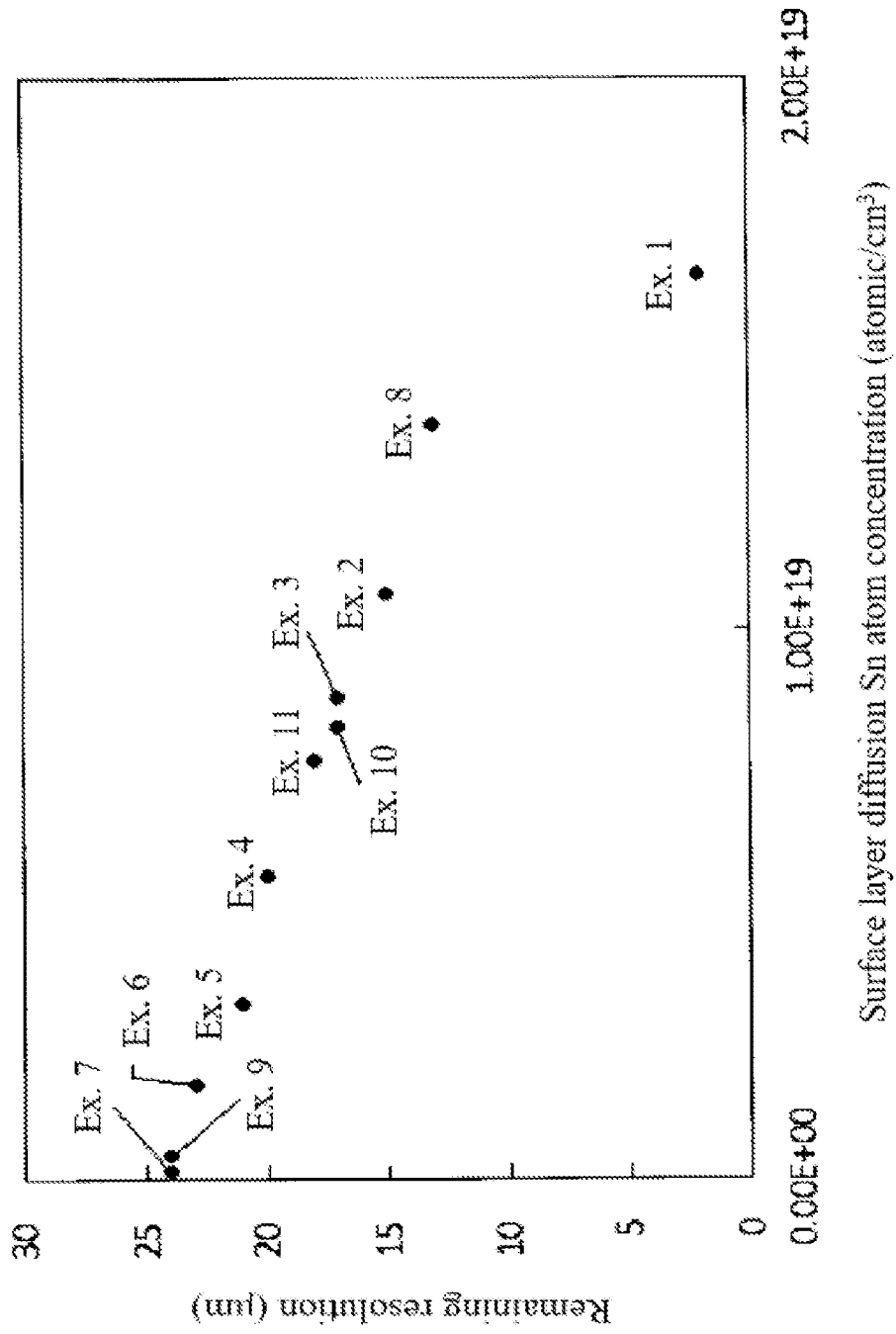
FIG. 1B is a graph showing a relation between the remaining resolution and a surface layer diffusion Sn atom concentration.

Table 2 shows results of evaluation as to respective items by the aforementioned methods using the glass substrates obtained in Examples 1-11. In addition, the relation between the remaining resolution and the inside Sn atom concentration and the relation between the remaining resolution and the surface layer diffusion Sn atom concentration are shown in FIG. 1A and FIG. 1B respectively.

TABLE 1

| Glass | A | B | C | D |
|---|---|---|---|---|
| $SiO_2$ | 65.8 | 65.8 | 66.9 | 65.2 |
| $Al_2O_3$ | 10.8 | 10.8 | 13 | 13.5 |
| $B_2O_3$ | 7.7 | 7.7 | 1.3 | 1.2 |
| MgO | 5.7 | 5.7 | 9 | 9.2 |
| CaO | 4.8 | 4.8 | 5.3 | 9.7 |
| SrO | 5 | 5 | 4.5 | 1.2 |
| BaO | 0 | 0 | 0 | 0 |
| $SnO_2$ | 0 | 0.1 | 0 | 0 |
| MgO + CaO + SrO + BaO | 15.5 | 15.5 | 18.8 | 20.1 |

TABLE 2

| Glass material | Polishing thickness (μm) | Example | Remaining resolution (μm) | Surface cleanliness | SIMS Surface layer Sn atom concentration: average Sn atom concentration at depth of 0.1-0.3 μm (atomic/cm³) | SIMS Surface layer Sn atom concentration: average Sn atom concentration at depth of 9.0-9.2 μm (atomic/cm³) | SIMS Surface layer diffusion Sn atom concentration: surface layer Sn atom concentration − inside Sn atom concentration (atomic/cm³) |
|---|---|---|---|---|---|---|---|
| A | 0 | 1 | 2 | B | 1.98E+19 | 3.37E+18 | 1.64E+19 |
|  | 0.3 | 2 | 15 | A | 1.40E+19 | 3.37E+18 | 1.06E+19 |
|  | 0.5 | 3 | 17 | A | 1.21E+19 | 3.37E+18 | 8.73E+18 |
|  | 1 | 4 | 20 | A | 8.86E+18 | 3.37E+18 | 5.49E+18 |
|  | 1.5 | 5 | 21 | A | 6.54E+18 | 3.37E+18 | 3.17E+18 |
|  | 2 | 6 | 23 | A | 5.07E+18 | 3.37E+18 | 1.70E+18 |
|  | 8 | 7 | 24 | A | 3.48E+18 | 3.37E+18 | 1.10E+17 |
| B | 1 | 8 | 13 | A | 3.11E+19 | 1.74E+19 | 1.37E+19 |
|  | 8 | 9 | 24 | A | 1.78E+19 | 1.74E+19 | 4.00E+17 |
| C | 1 | 10 | 17 | A | 1.17E+19 | 3.50E+18 | 8.20E+18 |
| D | 1 | 11 | 18 | A | 1.10E+19 | 3.42E+18 | 7.58E+18 |

| Glass material | SIMS Surface layer Sn atom concentration gradient: inclination of linear approximated curve at depth of 0.1-0.5 μm (atomic/cm⁴) | XPS ΔAl/Si value | XPS $N_{Si}$ [Si2p] | XPS $N_{Sn}$ [Sn3d5/2] | XPS $C_0$ | AFM Sa (nm) | AFM Stdi | AFM Δ/400 |
|---|---|---|---|---|---|---|---|---|
| A | −2.23E+23 | 0.21 | — | — | — | 0.15 | 0.77 | 91.8 |
|  | −9.59E+22 | 0.28 | 72003 | 1120 | 0.0011 | 0.30 | 0.58 | 73.4 |
|  | −8.42E+22 | 0.29 | 71989 | 883 | 0.0009 | 0.37 | 0.55 | 63.2 |
|  | −5.46E+22 | 0.27 | 74233 | 629 | 0.0006 | 0.29 | 0.58 | 43.3 |
|  | −3.14E+22 | 0.28 | — | — | — | 0.32 | 0.60 | 29.7 |
|  | −9.25E+21 | 0.26 | — | — | — | 0.28 | 0.63 | 20.7 |
|  | 1.32E+22 | 0.27 | — | — | — | 0.34 | 0.53 | 1.1 |
| B | −1.25E+22 | 0.27 | 69865 | 1868 | 0.0019 | 0.31 | 0.53 | 70.0 |
|  | −8.57E+21 | 0.26 | — | — | — | 0.32 | 0.64 | 8.0 |
| C | −5.20E+22 | 0.27 | — | — | — | 0.27 | 0.60 |  |
| D | −9.08E+22 | 0.29 | — | — | — | 0.28 | 0.55 |  |

As shown in Table 2 and FIG. 1B, the surface layer diffusion Sn atom concentration correlates to the adhesion to the resin film. It has been proved that when the surface layer diffusion Sn atom concentration is $2.0 \times 10^{18}$ atomic/cm³ or more, excellent adhesion to the film formed on the glass substrate can be achieved. In addition, as shown in FIG. 1A, it has been proved that the Sn atom concentration of the inside of the glass substrate has no contribution to improvement of the adhesion to the film. Further, as shown in Table 2, it has been proved that when the surface layer diffusion Sn atom concentration is set at $1.4 \times 10^{19}$ atomic/cm³ or less, fluorescence emission from Sn atoms can be inhibited.

From these results, it has been proved that when the surface layer diffusion Sn atom concentration in at least one of the main surfaces of the glass substrate is set at $2.0 \times 10^{18}$ atomic/cm³ or more and $1.4 \times 10^{19}$ atomic/cm³ or less, excellent adhesion to the film formed on the glass substrate and improvement of production efficiency can be achieved.

The present invention has been described in detail with reference to its specific embodiments. However, it is obvious for those in the art that various changes or modifications can be made on the invention without departing from the spirit and scope thereof. The present application is based on a Japanese patent application (Japanese Patent Application No. 2018-173839) filed on Sep. 18, 2018, the contents of which are incorporated herein by reference.

The invention claimed is:

1. A glass substrate comprising a pair of main surfaces and an end surface, and
   having a surface layer diffusion Sn atom concentration of $2.0 \times 10^{18}$ atomic/cm³ or more and $1.4 \times 10^{19}$ atomic/cm³ or less in at least one of the main surfaces, the surface layer diffusion Sn atom concentration being obtained by subtracting an Sn atom concentration of an inside of the glass substrate from an Sn atom concentration of a surface layer of the glass substrate,
   wherein the Sn atom concentration of a surface layer of the glass substrate is defined as an Sn atom concentration at a depth of 0.1 to 0.3 μm from the main surface and the Sn atom concentration of an inside of the glass substrate is defined as an Sn atom concentration at a depth of 9.0 to 9.2 μm from the main surface,
   having an Sn atom concentration gradient of a surface layer of the glass substrate of $-1.0 \times 10^{23}$ atomic/cm⁴ or more and $-1.0 \times 10^{22}$ atomic/cm⁴ or less in the at least one of the main surfaces,
   wherein the Sn atom concentration gradient of a surface layer of the glass substrate is defined as an inclination of a linear function obtained by linearly approximating a depth profile of an Sn atom concentration (atomic/cm$^3$) at a depth of 0.1 to 0.5 μm from the main surface.

2. The glass substrate according to claim 1, comprising an alkali-free glass comprising, in mol % on an oxide basis:
50 to 75% of SiO$_2$;
7 to 25% of Al$_2$O$_3$;
0.1 to 12% of B$_2$O$_3$; and
7 to 25% in total of at least one compound selected from the group consisting of MgO, CaO, SrO and BaO.

3. The glass substrate according to claim 2, wherein the alkali-free glass has a strain point of 650° C. or higher, and an average thermal expansion coefficient at 50 to 350° C. of 30×10$^{-7}$ to 45×10$^{-7}$/° C.

4. The glass substrate according to claim 2, wherein the alkali-free glass has a content of alkali metal oxides of 0.5% or lower, in mol % on an oxide basis.

5. The glass substrate according to claim 1, being produced by a float process.

6. The glass substrate according to claim 1, wherein the at least one of the main surfaces is a polished surface formed by polishing.

7. The glass substrate according to claim 6, wherein the polished surface has an Stdi value of 0.75 or less, the Stdi value is a texture-direction index obtained with an observation visual field of 1 μm×1 μm and the number of pixels of 256×256 by an AFM (Atomic Force Microscopy).

8. A black matrix substrate comprising the glass substrate according to claim 1, and a black matrix film formed on at least one of the main surfaces of the glass substrate.

9. A display panel comprising the black matrix substrate according to claim 8.

* * * * *